United States Patent [19]

Spears

[11] 4,044,092
[45] Aug. 23, 1977

[54] GROOVE MOLDING METHOD

[76] Inventor: Wayne Spears, 12884 Bradley Ave., Sylmar, Calif. 91342

[21] Appl. No.: 681,705

[22] Filed: Apr. 29, 1976

Related U.S. Application Data

[60] Division of Ser. No. 528,259, Nov. 29, 1974, Pat. No. 3,966,385, which is a continuation-in-part of Ser. No. 422,776, Dec. 7, 1973, abandoned.

[51] Int. Cl.$^2$ .......................... B29C 1/14; B29C 1/14
[52] U.S. Cl. .................................. 264/318; 264/296; 264/322
[58] Field of Search ...................... 264/318, 322, 296; 425/392, 393

[56]  References Cited
U.S. PATENT DOCUMENTS

| | | | |
|---|---|---|---|
| 3,205,535 | 9/1965 | Niessner | 425/393 X |
| 3,484,900 | 12/1969 | Sands | 425/393 X |
| 3,557,278 | 1/1971 | Kuhlemann | 264/318 |
| 3,749,543 | 7/1973 | Stansbury | 425/393 X |
| 3,861,847 | 1/1975 | Barnett | 264/322 X |

Primary Examiner—Richard R. Kucia
Attorney, Agent, or Firm—Robert J. Schaap

[57] ABSTRACT

A method for molding, in a single integrated operation, a tubular part having an internal recess which may take the form of a groove extending completely around the inside of the part for receipt therein of an O-ring or the like. The method utilizes an apparatus which comprises a core assembly having a longitudinal axis, and base means movable along the axis and defining an annular outer mold surface for forming of the interior wall of the tubular part. The core assembly further includes a plurality of groove-forming segments carried on the base means adjacent to the annular surface and movable between first contracted positions and second expanded positions. In accordance with the method, when the segments are in the contracted positions they do not extend radially outwardly of the annular surface, and the segments may be withdrawn from the molded tubular part by movement along the longitudinal axis. The segments are movable, incident to movement of the annular surface into the mold cavity, to the radially expanded molding positions wherein they extend substantially radially outwardly from the annular surface. The segments are mechanically locked in the radially expanded positions during molding of the tubular part. After the part is molded, some of the groove-forming segments are moved radially inwardly to withdraw them from the molded groove. Then, these withdrawn segments move axially relative to the remaining segments and the latter segments themselves withdraw from the groove. The segments are configured and arranged so that some can move radially inwardly from the expanded positions. Thus, deep, circumferential grooves can be molded in a tubular part as part of the basic molding of the part, and without requiring a secondary operation.

18 Claims, 16 Drawing Figures

GROOVE MOLDING METHOD

This application is a divison of Application Ser. No. 528,259, filed Nov. 29, 1974, (now U.S. Pat. No. 3,966,385, dated June 24, 1976) which is, in turn, a continuation-in part application of application Ser. No. 422,776, filed Dec. 7, 1973 (now abandoned).

Many applications for tubing or piping require the provision of an internal recess of one form or another. A common requirement is for a complete circumferential internal groove of substantial depth adjacent to the end of a tubular part. In particular, it is often desirable to provide such a groove in a pipe fitting for the receipt of an O-ring which serves to provide a high quality seal at the juncture between that fitting and a length of piping.

There is a need for such tubular parts or members with relatively deep grooves. For example, a nominal 4 inch pipe length with an enlarged circumferential band around one end with an O.D. of about 5¾ inches and an I.D. of about 4½ inches would desirably have a complete circumferential internal groove with a depth of ⅛ inch or more. Such groove might, for example, be in the range of ¾ inch in its axial width and spaced about ½ inch from the end of the part. Molding such pipe, particularly in the larger sizes, produces extraordinarily large forces and applicant is not aware of any other apparatus or method of molding such an annular groove in a tubular part on an acceptable commercial basis. Whatever efforts there have been in this direction have been limited in depth and size of groove and have involved complicated, highly sophisticated, and very costly devices.

For these reasons, molded tubular parts having annular grooves have been commercially produced by the utilization of various secondary operations. In this connection, sections of tubular construction have been fabricated together by means of spin welding or solvent welding techniques. Alernatively, such grooves have been machined into the tubular part after it has been molded. Another technique used has been to impress a hardened rubber ring into the interior of the molded tubular part, with the ring being removable by virtue of its flexibility, from the hardened part to leave the desired groove. This is a nonautomatic operation, generally involving manual placement and removal of the rubber ring for each part made. Similarly, compressible springs members have been used, with the spring member being compressed to permit its withdrawal from the formed groove. Again, manual insertion and removal of each separate compressible spring for each molded groove is required.

The present invention contemplates a method for molding a tubular part while at the same time forming an internal recess, such as a groove around the inside of the part. The present method is performed in conjunction with an apparatus having a core assembly which includes a plurality groove-forming means or segments and which move between expanded groove-forming positions and contracted positions. The contracted positions permit withdrawal of the core assembly from the molded part. In one form of the apparatus, expansion and contraction of at least some of the groove-forming means or segments are effected by positive mechanical drive, and there is a positive mechanical lock of the groove-forming segments in their expanded groove-forming positions. In their locked expanded positions, groove-forming segments can withstand extremely large radially inward molding pressures. In one embodiment the mechanical positive expansion, the locking in expanded position, and the contraction are all accomplished automatically incident to the axial movement of the core assembly into and out of the mold cavity. To permit molding of deep and/or lengthy grooves, where substantial contraction of large and/or crowded groove-forming means is desired, the groove-forming means or segments are configured and arranged so that some segments are initially moved radially inwardly to withdraw them from the molded groove; then they move axially relative to the other segments, and the other segments are given room to themselves withdraw from the groove. The apparatus and method presented herein permit a large amount of expansion and contraction relative to the cross section of the structure, and can thereby provide grooves which are deep in relation to the diameter or transverse dimension of the tubular molded part. The illustrated apparatus is strong and rugged for repeated usage on a commercial basis to provide in particular large heavy duty molded pipe fittings. The illustrated core assembly is sufficiently strong and solid and so arranged and so supported that there is an acceptable minimum of deflection of the core assembly incident to the molding operation.

Figure 1:
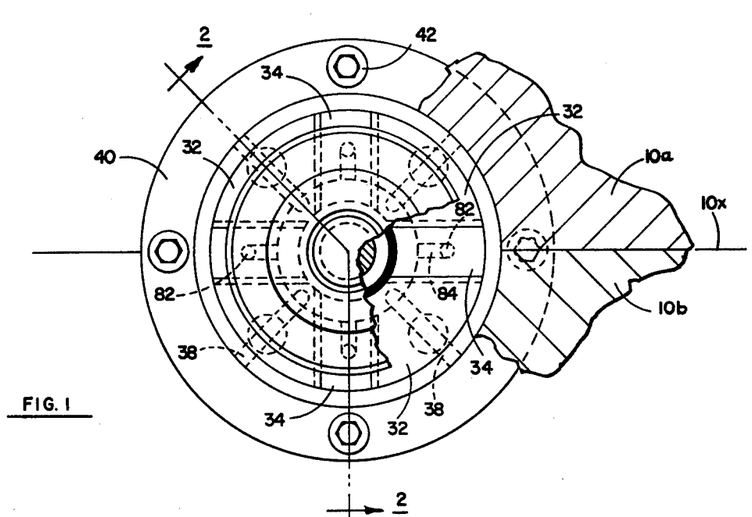
FIG. 1 is a view, partially broken away and schematic, representing a portion of a molding apparatus embodying the present invention, a core assembly of the apparatus being viewed from its forward end.

A preferred embodiment of the apparatus of the present invention is shown in FIGS. 1–6. A mold base or mold designated generally 10 defines a generally cylindrical mold cavity 12 for molding a tubular part 14. The mold base may be of conventional construction as is well known in the art and it may be suitably mounted on a standard molding machine (not shown). Injection molding will be described; however, other molding methods such as compression molding may be utilized. For purposes of describing the present structure, fragmentary portions of halves or sections 10a and 10b of the mold base 10 are shown in FIG. 1. The mold base sections 10a, 10b meet in a horizontal parting plane designated 10x in FIG. 1 which passes through the central axis of the cavity 12 and of the part 14 to be molded therein. For molding of the part, the mold sections 10a, 10b are moved into engagement as shown in FIG. 1 and held in that position under high pressure while fluid injection molding material is injected under high pressure into the cavity 12 by conventional means (not shown). When the material solidifies, the mold sections 10a, 10b, are separated from one another to permit removal of the molded part 14. The apparatus has application to various materials such as plastics, asbestos or fiberglass.

Figure 2:
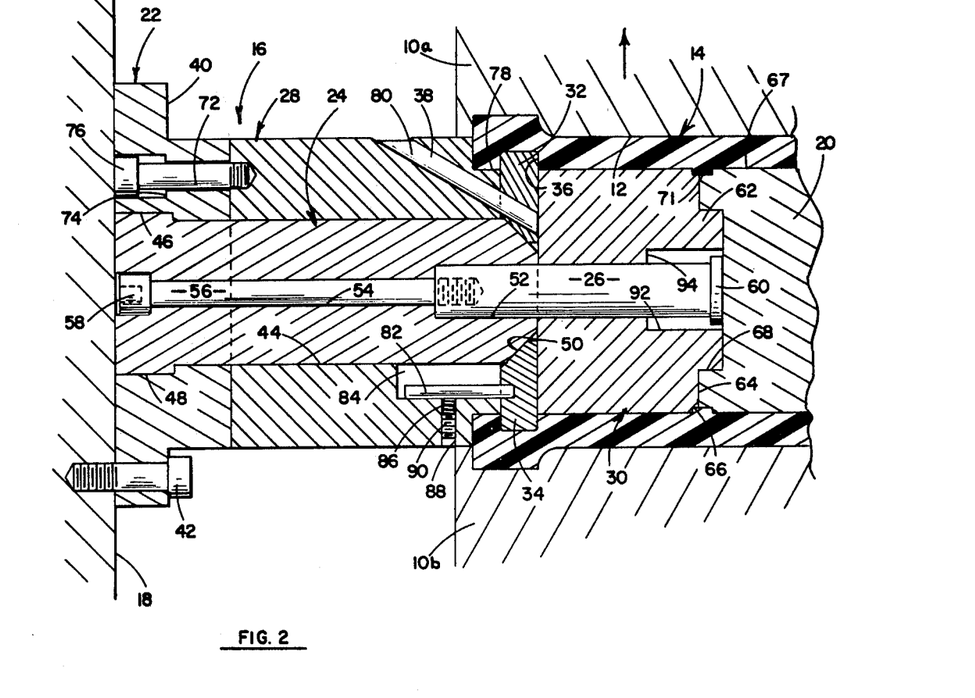
FIG. 2 is a side sectional view taken generally along line 2—2 of FIG. 1, showing the core assembly in its forwardmost molding position with the groove-defining means in their radially outwardly expanded positions.
Figure 5:
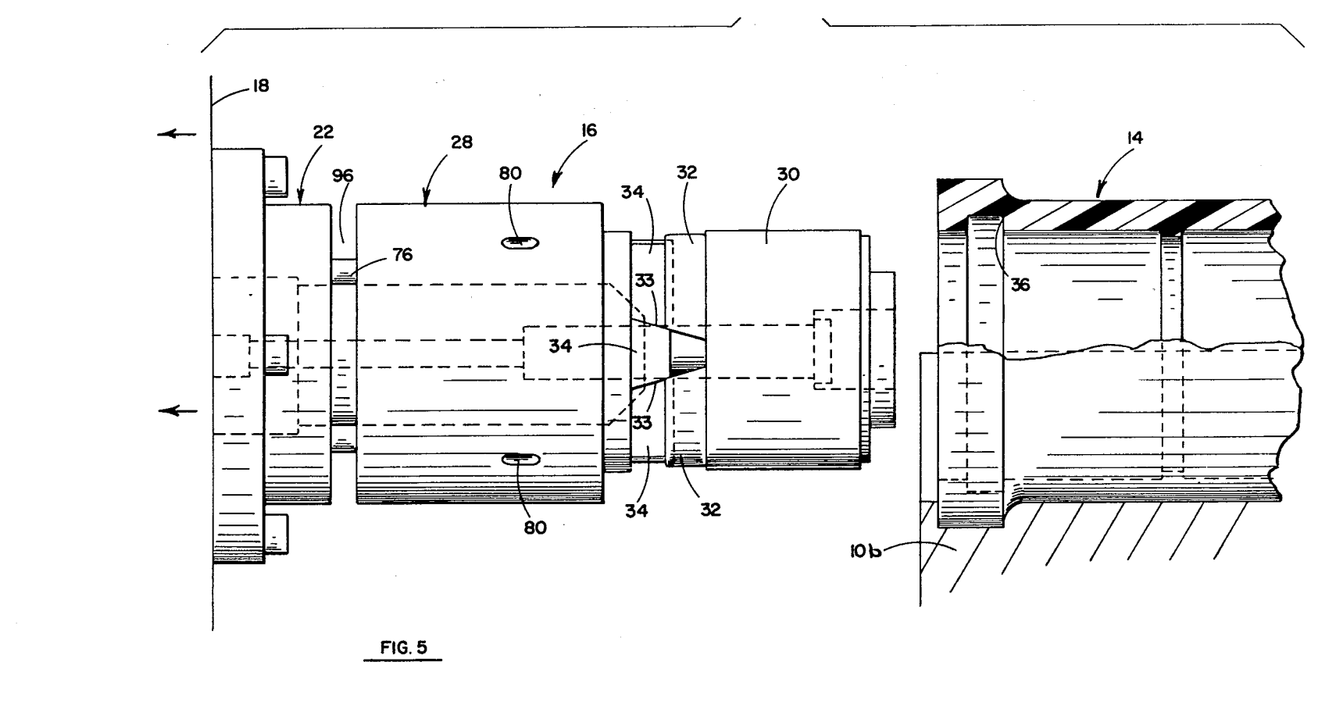
FIG. 5 is generally similar to FIGS. 2-4, however the core assembly is shown withdrawn from the molded part.

The interior of the tubular molded part is formed by the insertion of a core or core assembly 16 into the cavity 12 in a position such as shown in FIG. 2. When the part is being molded, the core assembly 16 is in the position shown in FIG. 1. After completion of the molding, the core assembly may be rearwardly withdrawn from the mold cavity and from the molded part to a position such as shown in FIG. 5. The illustrated core assembly 16 is mounted on a horizontally movable slide 18 (shown only schematically) of the molding machine for movement into and out of the mold cavity 12. The movement of the mold halves or section 10a, 10b, and of the core assembly 16 is normally hydraulically powered and in the desired timing sequence.

The orientation of the molding machine and of the core assembly may be changed as desired; the assembly is shown movable horizontally simply by way of example. "Forward" is similarly defined as "into the mold cavity" and "rearward" as "out from the cavity."

The drawings illustrate the use of a simple inter-facing core 20 which does not include groove forming means. This core 20 may be mounted on a slide (not shown) of the molding machine similar to slide 18, which positions core 20 opposite from and axially aligned with core assembly 16. Thus, the core 20 is retractable from the mold cavity 12 and from the molded part 14 in the opposite direction from core assembly 16. The forward or axially inward end of the core 20, combines with the core assembly 16 and the mold base sections 10a, 10b to completely enclose and define the annular cavity 12 in which the tubular member 14 is molded. The forward end of core 20 interfaces and interlocks with the forward end of the core assembly 16, as will be described more fully below. Alternatively, the core 20 could be replaced by a core assembly comparable to core assembly 16 to thereby form a circumferential groove adjacent the second end of the molded part 14.

The illustrated core assembly 16 comprises generally a base member 22 to which a central locking stud member or shaft 24 and a central pull pin 26 are secured to provide a base or pull section. Mounted for axial relative movement on the pull section are an intermediate drive or positioning sleeve member 28 and a main core body or plug 30. A plurality of groove forming or defining means or segments (comprised of one group of segments 32 and one group of segments 34) are also movably mounted on the base section for movement between retracted positions generally aligned with the I.D. of the molded part, and extended or expanded positions substantially radially outwardly of the I.D. of the molded part. In their expanded positions the segments 32, 34 form the continuous circumferential groove 36 which is located adjacent to one end of the molded part. Mechanical drive means in the form of angled cam pins 38 are disposed between one of the sets of groove forming segments, segments 32, and the positioning sleeve 28, whereby axial relative movement of the sleeve 28 provides positive mechanical control of the radial inward and outward movement of the segments 32. The other set of groove forming segments, segments 34, also move radially inwardly and outwardly in coordination with the radial movement of the segments 32. The illustrated core assembly also achieves relative axial movement between segments 32 and segments 34 incident to the radial expansion and contraction of these segments. The forward end of the central locking stud member 24 effects a positive mechanical lock of the segments 32, 34 in the extended groove forming positions shown in FIG. 2.

Now to consider the illustrated core assembly 16 in further detail. Base member 22 is a generally annular part having a peripheral flange 40 extending radially outwardly around its rear end. The flange 40 may be used to secure the base member 22 to the slide 18 of the mold machine by any suitable means such as bolts 42. The base member 22 has an internal bore 44 which has an enlarged counterbore portion 46 at its rearward end. The illustrated base member is generally cylindrical externally and within its bore. The central locking shaft 24 is generally cylindrical and has an enlarged rear end 48. The locking shaft 24 is received within the bore 44 of the base member 22, with the enlarged rear end 48 received in the enlarged counterbore end portion 46. This limits relative forward motion of the central locking shaft 24 relative to the base member 22 is bolted to the slide 18, relative rearward movement by the locking shaft is also prevented. Thus, the base member 22 and the locking shaft 24 are effectively locked to one another for common forward and backward axial movement. The forward end of the central locking shaft 24 defines a frusto-conical camming and locking surface 50 for engaging mating surfaces of the segments 32, 34 as will be explained below. The locking shaft 24 should be relatively strong, rigid and durable. The camming and locking surface 50 should be smooth and hard. The illustrated surface 50 is at an angle of about 45° from the assembly axis.

The forward end of the locking shaft 24 is provided with an axial bore 52 in which the rearward end of the central pull pin 26 is received. A smaller diameter axially extending hole 54 is drilled from the rear end of the locking shaft 24 and a securing bolt 56 extends through the hole 54 and is threaded into the rear end of the pull pin 26. The bolt 56 has an enlarged head 58 which is received in a mating counterbore in the rear end of the hole 54. The head 58 of the bolt may be provided with an internal socket configuration for purposes of securing the bolt 56 to the pin 26. Thus the bolt 56 securely holds the pin 26 to the locking shaft 24 and to the base member 22 for common axial movement of these parts as a unit. As noted above, these combined parts are sometimes referred to as a base or pull section of the apparatus. The pin has an enlarged head 60 at its forward end.

The main core body or plug 30 is a generally cylindrical part having a flat rear surface and a forward surface comprised of a plurality of concentric annular portions. In this connection the forward end of the core body 30 has a center alignment portion 62 which extends forwardmost. Surrounding the alignment portion 62 is an intermediate forwardly facing annular contact surface 64. Extending around the periphery of the intermediate surface 64 is a small circumferential groove 66. The core 20 referred to above has a forward end which mates with the forward end of the core body 30 in a close interlocking fit. More particularly, the forward end of the core 20 has a cylindrical outer surface 67 of matching diameter to that of the core body 30, which is also the inner diameter of the part to be molded. The core 20 has a recess 68 centrally of its forward end for receiving the alignment portion 62 of core body 30. Further, the forward end of core 20 has a peripheral or circumferential groove 70 much like the circumferential groove 66 on the forward end of the core body 30. Grooves 66 and 70 define an annular internal stop rib 71 to be molded around the inside of the part 14. Thus, when the core 20 and the core assembly 16 are in abutted mating positions as shown in FIG. 2, they define the interior and ends of the molded part. The core 20 also provides the resistance or limit to further forward movement of the core body 30 required for operation of the core assembly 16 as will be described below.

The positioning sleeve member 28 is a generally tubular cylindrical part which is disposed on the central locking shaft 24 for axial sliding movement therealong. The sleeve member 28 has a flat transverse rear end which engages the flat transverse forward end of the base member 22 when the core assembly is in the expanded condition shown in FIG. 2.

The positioning sleeve member 28 and the base member 22 are coupled to each other so as to permit a limited amount of relative axial movement therebetween. More particularly, the base member 22 has a plurality of circumferentially arranged holes 72 which extend through the base member parallel to the central axis, and which are each counterbored at the rear end of the base member to provide an annular stop shoulder 74. A pull pin 76 having an enlarged head and a threaded end extends through each of these holes 72 and is threaded into the rearward end face of the positioning sleeve member 28. The head of the pin 76 is disposed within the counterbore of the hole 72 so that after the base member 22 has moved rearwardly to the position shown in FIG. 3, the bolt head engages the shoulder 74 of the counterbore and further rearward movement of the base member 22 will move the sleeve member 28 rearwardly along with it.

The forward end of the sleeve member 28 has a reduced diameter to provide a generally cylindrical outer surface 78 which generally coincides or aligns with the cylindrical outer surface of the core body 30.

Disposed generally circumferentially around the forward end of the central locking shaft 24 are the segments 32 and 34. In the illustrated structure, there are four of the generally wedged-shaped segments 32 and there are four of the generally elongated or bar-shaped segments 34. The segments 32, 34 are arranged alternately so that each segment is spaced from the other segments in its group and has one of the segments in the other group on either side of it. The radially inward end faces of the segments may be suitably contoured and undercut so that when they are in the inward contracted positions shown in FIGS. 1 and 2 these inner faces will generally conform to the frusto-conical end surface 50 of the central locking shaft 24. As is shown best in FIG. 2, with the locking shaft 24 positioned forwardly relative to the segments 32, 34, the segments are limited from moving radially inwardly from their extended, groove-forming positions despite the high radially inward pressures exerted on them by the molding material in the cavity. It may be desirable that not all of the segments directly engage the surface 50 when the part is being molded. Rather, the surface 50 of the locking shaft 24 may only engage the radially inward end faces of the bar-shaped segments 34. The segments 34 may in turn engage along their side faces the side faces of the wedge-shaped segments 32 to thereby maintain the segments 32 in their outwardly extended positions. Thus, there may be some slight clearance in such situations between the radially innermost end faces of the wedged-shaped sections 32 and the camming surface 50. This arrangement avoids the possibility of the segments 32 and the surface 50 colliding and damaging the apparatus, as by bending or breaking the cam pins 38.

Figure 6:
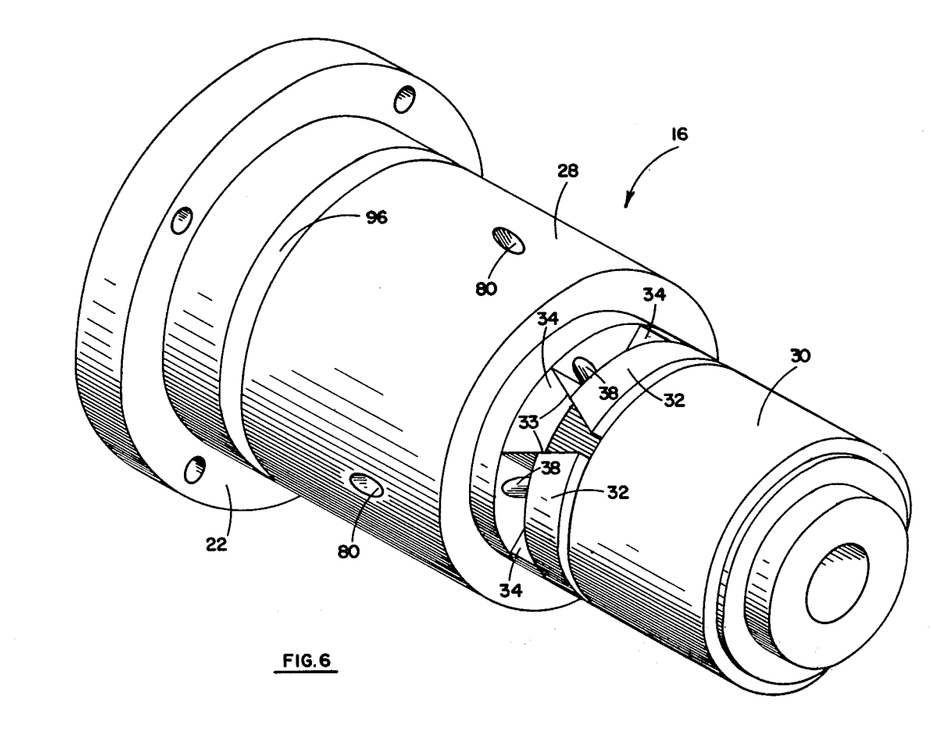
FIG. 6 is a perspective view of the core assembly in the fully retracted position of FIGS. 4 and 5.

As indicated by broken lines in FIG. 1 and as shown in FIGS. 5 and 6, the side faces of the bar-shaped segments 34 are undercut to create a tapered or inclined interface 33 between each segment 34 and the adjacent segment 32.

As shown in FIG. 2, the segments 32, 34 have generally flat forward and rearward surfaces adapted to abut respectively the rear face of the core body 30 and the forward end face of the sleeve member 28 when the segments are in their extended groove-forming positions.

Figure 3:
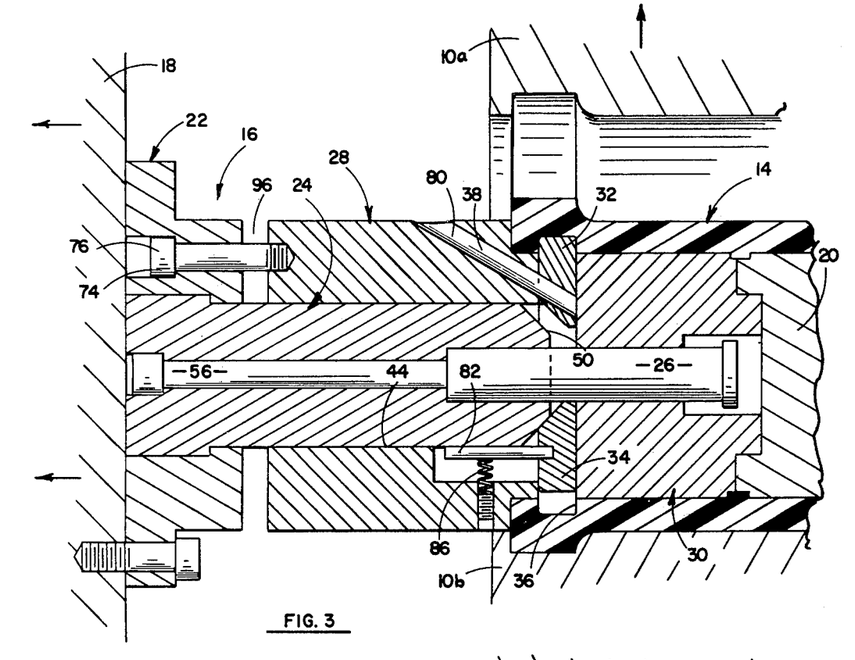
FIG. 3 is generally similar to FIG. 2, showing the core assembly in an intermediate or partially rearwardly withdrawn position, but with the groove-defining means still in their radially outwardly expanded positions.
Figure 4:
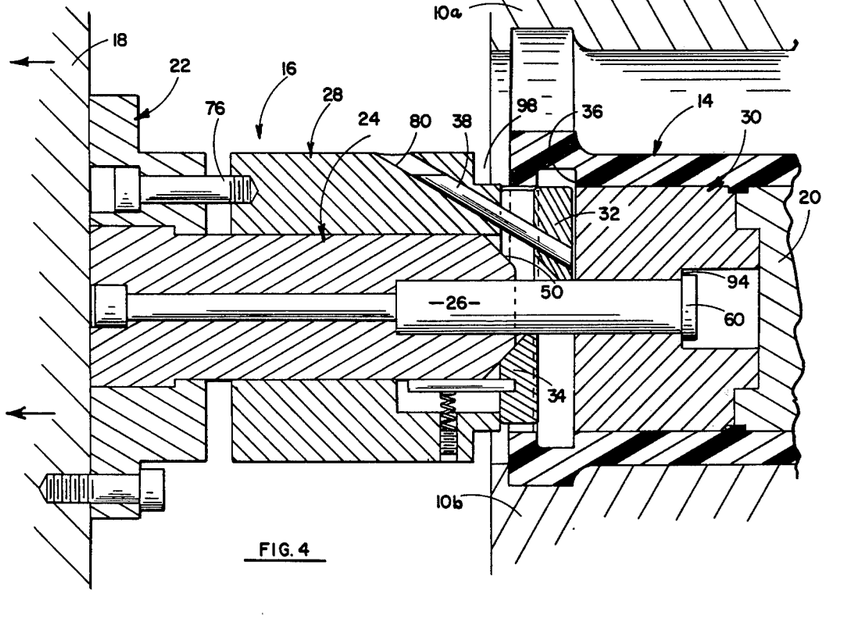
FIG. 4 is generally similar to FIGS. 2 and 3, however, it shows the core assembly in its fully rearwardly retracted position with the groove-defining means fully contracted to their radially inward positions.

As noted generally above, the wedged-shaped segments 32 are each coupled by means of an angled cam pin 38 to the sleeve member 28. Each cam pin 38 is secured at its forward end to its associated wedged-shaped segment 32 and the remainder of the cam pin is slidably received within an angled channel 80 which extends through the forward portion of the sleeve member 28. The cam pins 38 and the channels 80 are constructed to limit rotational movement of the pins, as by means of mating non-circular cross sections of the pins and channels, keyways, or the like. This limits undesired twisting or turning of the segments 32. The illustrated channel extends at approximately 30° from the central axis of the core assembly 16. When the segments 32 are in their extended positions as shown in FIG. 2, the rear end of the associated cam pin 38 extends substantially the full length of the channel 80. After the central locking shaft 24 has been withdrawn rearwardly as shown in FIG. 3, further rearward movement of the base member 22 and the sleeve member 28 effects a movement of the wedge-shaped segments and their associated cam pins 38 toward the positions shown in FIG. 4. Thus as the sleeve member 28 and the channel 80 move axially rearwardly relative to the segments 32 and their cam pins 38, the pins slide at an angle axially forwardly and radially inwardly in the direction of the groove or channel 80. This moves the wedge-shaped segments 32 radially inwardly while also creating a break or separation between the segments 32 and the forward end of the sleeve member 28 (FIG. 4). This radially inward retraction of the wedged-shaped segments 32 serves to positively withdraw them from within the molded annular groove of the part.

Before the wedge-shaped segments 32 can be contracted radially inwardly, space must be provided for their inward movement. This space is provided in the illustrated apparatus by the rearward axial movement of the bar-shaped segments 34. However, before these bar-shaped segments 34 can move rearwardly, they must first be withdrawn from the molded groove 36. The segments 34 are spring biased radially inwardly. More particularly, each of the bar-shaped segments 34 is secured to the forward end of a dowel pin 82 which is received in an axially extending slot 84 in the forward end of the sleeve member 28. Each segment 34 is biased radially inwardly by means of a small coil spring 86. The radially inward end of each spring 86 impinges on an associated dowel pin 82 with the remainder of the spring 86 being disposed in a channel 88 that extends radially outwardly through the wall of the sleeve member 28 in circumferential alignment with the associated pin groove 84. An adjustable set screw 90 may be threaded into the outside of each channel 88 to adjust the tension on the spring 86.

The segments 34 are locked against radially inward movement by the locking surface 50 as noted above. When the center shaft 24 and the surface 50 move rearwardly toward a position such as shown in FIG. 3, the segments 34 are permitted to be moved by springs 86 radially inwardly to positions shown in that FIG. 3. It will be noted that at this time, the sleeve member 28 has not begun to move rearwardly so that the segments 32 are mechanically held in their expanded positions, and do not exert any appreciable force on the segments 34. Thus, there is little resistance to the radially inward movement of the segments 34. The radially outward end portions of the segments 34 may be slightly tapered and the tendency of the molded material is to urge the segments radially inwardly and out the groove 36. Further, while sleeve member 28 has not been drawn rearwardly at this time, the forward force on it transmitted through base member 22 has been relieved so that there is little if any compressive force being exerted on the forward and rearward faces of the segments 34. Thus, the springs 86 move the segments 34 radially inwardly against no significant resistance.

The apparatus is proportioned so that when the bar-shaped segments 34 have withdrawn radially inwardly (FIG. 3) from the groove 36, the bolts 76 are engaged by the shoulders 74 to begin the retraction of sleeve member 28 and the radially inward movement of the segments 32. The wedge-shaped segments 32 bear against the bar-shaped segments 34 to force the latter axially rearwardly as the segments 32 move radially inwardly. Thus, the segments 32, 34 are moved to the contracted positions shown in FIGS. 4 and 5.

The core body 30 is provided with a central opening 92 at its forward end. The central opening 92 has an annular bottom contact surface 94 which engages the head 60 of the pull pin 26 when the pull pin is tracted fully rearwardly. As shown in FIG. 4, the head 60 may be arranged so as not to engage the surface 94 until slightly after the segments 32 are withdrawn from the groove, to thereby ensure proper withdrawal of the segments 32 before there is rearward withdrawal of the core assembly out of the molded part.

The core body member 30 may thus be withdrawn from the interior of the molded tubular part 14 as illustrated in FIG. 5.

The mold base sections 10a and 10b may be configured to engage the exterior wall of the sleeve member 28 to completely enclose the cavity 12. The core assembly 16 may be provided with suitable cooling means such as are known in the art.

The various parts of the illustrated core assembly may be made from high strength, durable and tough material such as tool steel.

Now the operation of the apparatus will be explained.

As noted above, FIG. 2 shows the apparatus in its position immediately after a part 14 has been molded. The slide 18 and core assembly 16 are in their forward-most position and the groove-forming means or segments 32, 34 are in their radially-outward extended or expanded positions. The forward end of the base member 22 is abutting the rearward end of the sleeve member 28, which in turn abuts the groove-forming segments 32, 34. The segments 32, 34 themselves abut the rearward end of the core body 30 which is in interlocking and abutting relationship with the core 20. The segments 32, 34 are positively locked in their expanded positions by the core assembly structure. In this connection, the cam pins 38 in the channels 80 serve, through the location of the slidable sleeve member 28, to define the positions of the wedge-shaped segments 32. The segments 32, 34 are held against axial movement by the forward face of the sleeve member 28 and the rearward face of the core body 30. The frusto-conical surface 50 of the center shaft 24 prevents radially inward movement of the segments 32, and 34. In addition, the bar-shaped segments 34 engage the wedge-shaped segments 32 to form a continuous annular ring and prevent radially inward movement of the segments 32. Radially outward movement of the segments 32, 34 is also prevented by the cam pins 38 and the pins 82, respectively.

When the molding of the part has been completed, the molding apparatus proceeds toward its first stage of opening illustrated in FIG. 3. The movable upper mold half 10a withdraws upwardly a sufficient distance to permit removal of the molded part from the lower mold half 10b. The slide 18 begins to move rearwardly, carrying with it the base member 22, the center shaft 24, and the pull pin 26. A first break 96 as shown in FIG. 3 occurs between the forward end of the base member 22 and the rearward end of the sleeve member 28. The engagement of the core assembly 16 with the interior of the molded part 14 limits rearward movement of the core body 30 and the extended segments 32, 34. The molded part 14 itself is locked against rearward axial movement by its disposition in the lower mold half 10b. As the slide 18 moves rearwardly from the position shown in FIG. 2, the slidable sleeve member 28 also remains in its forward position so that the base member 22 moves rearwardly relative to the sleeve member 28 to form the break 96 between these two members. There is sufficient frictional engagement between the forward end of the sleeve member 28 and the molded part to resist rearward axial movement of the sleeve member 28. It will be noted that during this time the only rearward pull on sleeve member 28 is a minimum amount of frictional pull exerted by the center shaft 24 sliding rearwardly in the bore 44 of sleeve member 28.

When the base member 22 reaches the rearward position shown in FIG. 3, the locking surface 50 has been moved rearwardly to create a central space radially inwardly of the expanded positions of the segments 32, 34. The bar-shaped segments 34 are thereby permitted to be biased radially inwardly by springs 86 to the positions of FIG. 3 and thus fully retracted from the annular groove 36. The radially outward portions of the segments 34 may be provided with a slight taper which results in a radially inward push on the segments 34 by the molded material defining the groove and surrounding said outward portions of the segments. This radially inward push assists the inward thrust of the springs 86.

FIG. 3 shows the base member 22 retracted rearwardly to the point where the annular shoulders 74 engage the enlarged heads of the bolts 76 attached to the sleeve member 28, so that further rearward movement of the base member 22 will draw the sleeve member 28 along with it. At this time, as noted above, the bar-shaped segments 34 have been moved radially inwardly so that they are completely withdrawn from the annular groove 36 and are free to move axially rearwardly without interference from the molded part and without causing damage to the molded part. The wedge-shaped segments 32 are still in their expanded radially outward positions within the annular groove.

As further rearward movement of base member 22 proceeds, sleeve member 28 is drawn rearwardly, which tends to effect longitudinal movement of the cam pins 38 along the channels 80 forwardly and towards the central axis of the core assembly. A break 98 thus occurs between the forward end of the sleeve member 28 and the rearward face of the wedge-shaped segments 32. This longitudinal movement of the cam pins 38 tends to move the wedge-shaped segments 32 radially inwardly and out of the annular groove 36 in the molded part. This radially inward movement of the wedge-shaped segments 32 tends to move to shift the bar-shaped segments 34 axially rearwardly. Thus, as shown in FIG. 4, the sleeve member 28 has been moved rearwardly, and the cam pins 38 have slid longitudinally forward in the channels 80 to thereby move the wedge-shaped segments 32 radially inwardly. The bar-shaped segments are shown in FIG. 4 shifted axially rearwardly. This axial rearward shifting of the bar-shaped segments 34 by the wedge-shaped segments 32 is facilitated by the inclined interface 33 between adjacent segments 32 and 34 as illustrated best in FIGS. 5 and 6.

FIG. 4 shows the segments 32, 34 fully retracted radially inwardly and the head 60 of the pull pin 26 engaging the annular surface 94 of the core body 30. Further rearward movement of the slide 18 and the base member 22 therefore begins to withdraw rearwardly the core body 30. At this point, there has been a relative displacement of segments 32, 34 causing a slight "overlap" therebetween as shown in FIG. 4. FIG. 5 shows the core assembly 16 fully withdrawn from the molded part 14. The part 14 may then be removed from the lower mold half 10b.

The parts of the apparatus then return to the molding position shown in FIG. 2. More particularly, the upper mold half 10a moves downwardly to reassume its position of FIG. 2. The slide 18 begins to move forwardly until the forward end of the core body 30 engages the core 20. After that, further forward movement of the base member 22 causes the core assembly to reclose to its condition of FIG. 2. The gap 96 between member 22 and sleeve member 28 closes and the gap 98 between sleeve member 28 and the segments 32 also closes. The cam pins 38 slide rearwardly into the channels 80 and the wedge-shaped segments 32 are expanded radially outwardly. The bar-shaped segments 34 are moved axially forward and also expanded radially outwardly by frustoconical surface 50. Surface 50 is then positioned so as to lock the segments 32, 34 in those radially outward positions. The precise sequence of the parts returning to the expanded condition of FIG. 2 is not as critical as it is when contracting and then withdrawing the core assembly since there is no molded part in the cavity which needs to be considered.

With the apparatus returned to its condition shown in FIG. 2, a further part may be molded in the cavity 12 and the sequence of operations will repeat itself in accordance with the above description. It will be noted that there is no significant increase in the molding time for the illustrated part over the time to mold that same part without a groove.

An alternate preferred embodiment of the apparatus of the present invention is shown in FIGS. 7–16. This apparatus is similar in many respects to the apparatus as shown in FIGS. 1–6 and generally comparable parts are designated by comparable numbers, with the prefix 1 being added to parts of the embodiment of FIGS. 7–16. The differences in the embodiments will be described in the following material.

A mold base or mold designated generally 110 defines a generally cylindrical mold cavity 112 for molding a tubular part 114. The mold further defines a generally cylindrical entrance section 113 which is in communication with the mold cavity 112. The portions of the mold are designated 110a and 110b.

Figure 11:
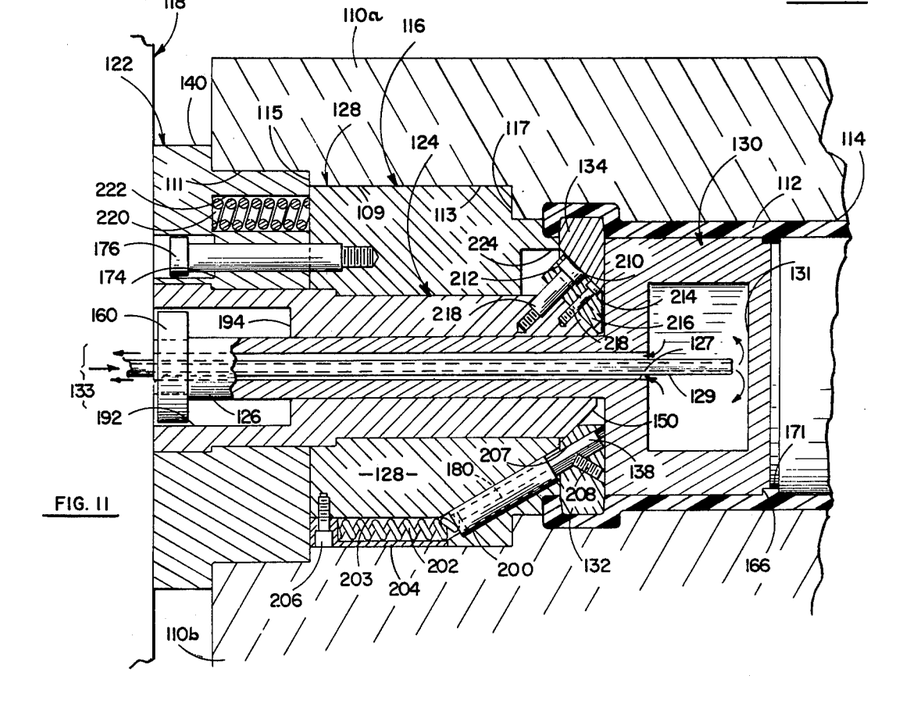
FIG. 11 is a side sectional view taken in general along line 11—11 of FIG. 7, showing the core assembly in its forward molding position with the groove-defining means in their radially outwardly expanded position.

The interior of the tubular molded part 114 is formed by the insertion of a core assembly 116 into the cavity 112 in a position such as shown in FIG. 11. The core assembly 116 may be mounted on a horizontally movable slide 118 of a molding machine for moving into and out of the mold cavity 112. The core assembly 116 interfaces, when in its forward position within the mold cavity 112, with the forward end of a core assembly like assembly 116.

The core assembly 116 comprises generally a base member 122 to which a central locking stud member or shaft 124 is secured to provide a base or pull section. Mounted for axial relative movement on the pull section are an intermediate drive or positioning sleeve member 128 and a main core body or plug 130. The core body 130 includes a central pull pin portion 126.

A plurality of groove forming or defining means or segments (comprised of one group of generally bar-shaped segments 134 and one group of generally wedge-shaped segments 132) are also movably mounted on the base section for movement between retracted positions generally aligned with the I.D. of the molded part, and extended or expanded positions substantially radially outwardly of the I.D. of the molded part. In their expanded positions segments 132, 134 form the continuous circumferential groove 136 which is located adjacent to one end of the molded part 114. Mechanical drive means are disposed between the sets of groove-forming segments and the remainder of the core assembly 116, whereby axial relative movements of parts of the core assembly provides positive mechanical control of the radial inward and outward movement of the segments. The illustrated core assembly 116 also achieves relative axial movement between segments 132 and segments 134 incident to the radial expansion and contraction of these segments. The forward end of the central locking stud member 124 effects a positive mechanical lock of these segments 132, 134 in the extended groove-forming position shown in FIG. 11.

Now consider the illustrated core assembly 116 in further detail, the base member 122 has a peripheral flange 140 at its rear end which may be secured to the slide 118 of the mold machine. The base member 122 is mechanically inter-locked to the central locking shaft 124 for common forward and rearward movement. The forward end of the central locking shaft 124 defines a frustoconical camming and locking surface 150 for maintaining the segments 132, 134 in their radially expended position, as will be further explained below.

The interconnection between the locking shaft 124 and the main core body 130 is provided by the pull pin portion 126 of the main core body. In the core assembly 16 of FIGS. 1-6, the pull pin 26 was secured to the locking shaft 24 and had an enlarged head 60 which engaged the core body 30 after the locking shaft 24 had moved a predetermined distance to thereby also move the core body 30 rearwardly with the remainder of the core assembly. In the present embodiment 116 of FIGS. 7-16, the central pull pin portion 26 is an integral rearward extension of the main core body 30 and it has an enlarged head 160 (which may be a separate piece threadably mounted thereon). The rear end of the locking shaft 124 has an extended counterbore 192 defining an annular shoulder 194 at its forward end. When the locking shaft 124 has moved sufficiently rearwardly, the shoulder 194 engages the enlarged head 160 so that the main core body 130 is thereafter moved rearwardly along with the locking shaft 124 (and the base member 122).

The main core body 30 is provided with an interior tooling cavity 131 that communicates with an axial bore 127 extending the length of the central pull pin portion 126. A coolant delivery tube 129 extends centrally through the bore 127 and into the cooling cavity 131. A flowpath for coolant is defined between the outside of the tube 129 and the wall of the bore 127. Coolant may flow forwardly through the coolant tube 129 into the coolant cavity 131 and may then return through the passageway between the tube 129 and the bore 127. The coolant tube 129 and the rear end of the bore 127 may be connected by suitable conduit means 133 to means (not shown) for circulating the coolant. The core body 130 has an annular peripheral groove 166 around its exterior forward end which serves to define an annular internal stop rib 171 to be molded around the inside of the part 114.

When the core assembly 116 is in its forward position, the main portion of the base member 122 is received in the largest rearmost portion 111 of the entrance section 113. The forward end of that entrance portion 111 forms an annular shoulder 115 against which the forward end of the base member 122 may rest when the core assembly 116 is forwardmost. Next forwardly in the entrance section 113 is an intermediate portion 109 of lesser diameter than the rearwardmost portion 111. This intermediate portion 109 defines an annular shoulder 117 at its forward end. The sleeve member 128 is received in this intermediate entrance portion 109 and sleeve member 128 has an annular shoulder adjacent its forward end which abuts the shoulder 117. The forward end of sleeve member 128 has an annular external groove comparable to the annular external groove at the forward end of sleeve member 28, which defines the rearward interior edge of the molded part 114. The mold cavity 112 is essentially the same as mold cavity 12 and the configuration of the part 114 is essentially like that of molded part 14.

Figure 7:
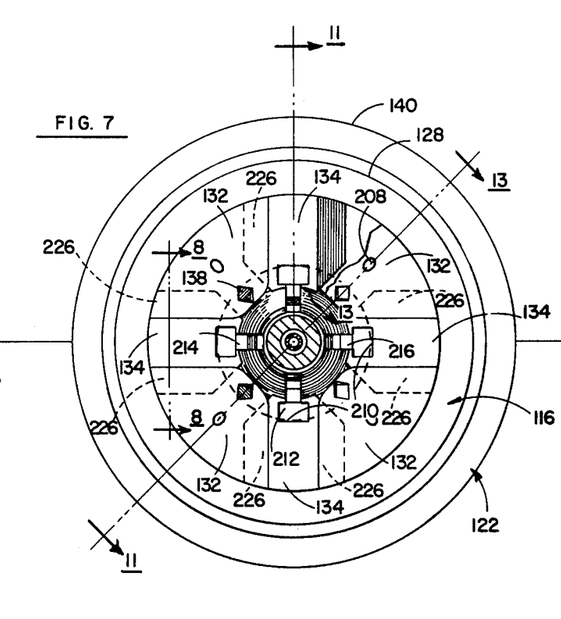
FIG. 7 is a view, partially broken away and schematic, representing a portion of a molding apparatus incorporating another preferred embodiment of the present invention, an alternate form of core assembly of the apparatus being viewed from its forward end.
Figure 8:
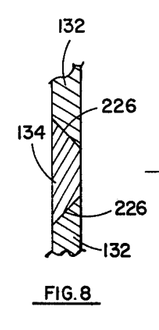
FIG. 8 is a sectional view taken generally along the line 8—8 of FIG. 7, showing the interface between adjacent segments of the groove-defining means.
Figure 9:
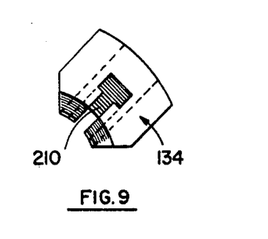
FIG. 9 is a view of an individual bar-shaped segment of the groove defining means.
Figure 10:
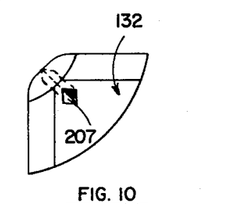
FIG. 10 is a view of an individual wedge-shaped segment of the groove-defining means.

The mechanical drive means between each of the wedge-shaped segments 132 and the sleeve member 128 is similar to that between segments 32 and sleeve 28. An angled slot or groove 180 is defined in the sleeve member 128 and a cam pin 138 is secured at its forward end to an associated wedge-shaped segment 132, with a remainder of the cam pin slidably received within the channel 180. The illustrated cam pin 138 and its mating channel 180 are shown as being square or oval in cross-section, to prevent rotation of the pin. The illustrated channel 180 is provided by separate sleeve 200 mounted in the sleeve member 128, and a coil compression spring 202 is mounted behind the rearward end of the pin 138 to urge it forwardly relative to the sleeve member 128. The spring 202 may be conveniently housed within a recess 203 formed in the sleeve member 128 and a cover 204 secured in place over the top of the recess as by means of a screw 206. The forward end of the cam pin 138 may be received in a mating hole 207 in the associated segment 132 and locked in place as by means of a set screw 208. Thus, axial movement of the sleeve member 128 effects radial movement of the wedge-shaped segment 132. As shown in FIG. 7, four of the wedge-shaped segments 132 are provided. A single wedge-shaped segment is illustrated in FIG. 10. The wedge-shaped segments 132 are generally similar to the segments 32. In terms of their configuration in relationship to the segments 132, the bar-shaped segments 134 are generally comparable to the bar-shaped segments 34. This is illustrated in FIGS. 8 and 9 in particular. FIG. 8 shows the angled interface 226 between the segments 132 and 134.

Figure 14:
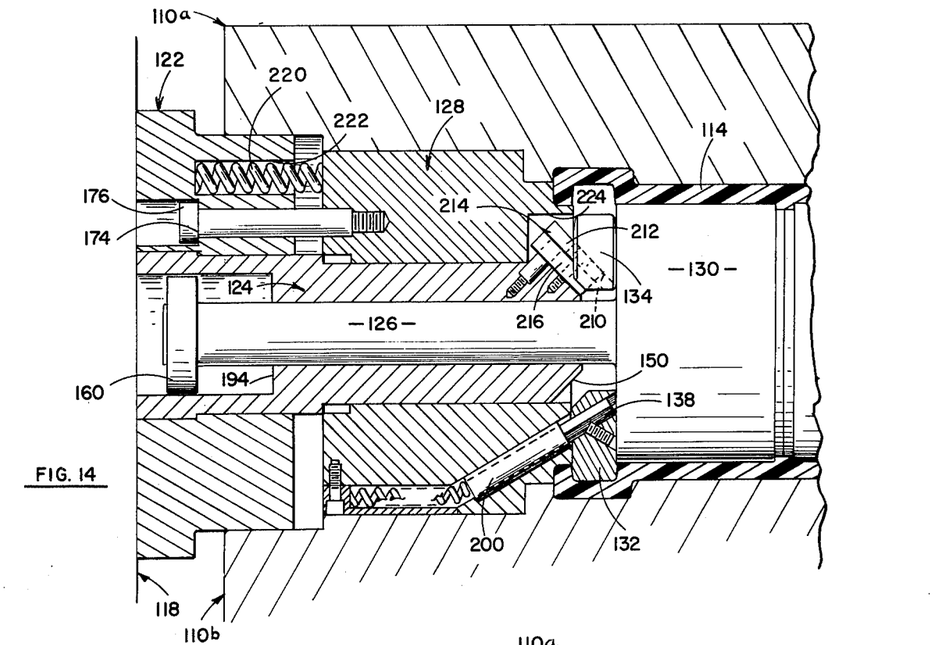
FIG. 14 is a side sectional view generally similar to FIG. 11, showing the core assembly in an intermediate or partially rearwardly withdrawn position, with the bar-shaped segments of the groove-defining means contracted to their radially inward position.

The bar-shaped segments 134 differ from the bar-shaped segments 34 in that the segments 34 were spring-biased whereas the bar-shaped segments 134 are mechanically interlocked to the central locking shaft 124. Each of the bar-shaped segments 134 is provided at its radially inward end with an elongated slot 210 which is generally T-shaped in cross-section. The slot 210 extends at an angle generally parallel to the conical surface 150 of the locking shaft 124. In each of the T-shaped slots 210 there is received a projection 212 that has a mating T-shaped configuration in cross-section. Each illustrated projection 212 is provided by a pair of plates 214 and 216 which are bolted to the surface 150 as by bolts 218. The projections 212 may be formed in any other suitable manner. Other specific arrangements and configurations of projections and grooves may also be utilized to provide the desired mechanical innerconnection between the segments 134 and the locking shaft 124. This mechanical interconnection between the bar-shaped segments 134 and the locking shaft 124 results in the segments being moved radially inwardly when the locking shaft 124 is moved axially rearwardly. This inward condition is illustrated in FIG. 14.

Springs 220 are provided between the base member 122 and the sleeve member 128 so that when the base member 122 is drawn rearwardly the sleeve member 128 is urged to remain in its forward position. More particularly, three holes 222 are formed from the forward end of the base member 122 spaced circumferentially therearound, with a coil compression spring 220 being disposed in each of the holes. The springs 220 bear against the rearward end of the sleeve member 128.

The operation of the core assembly 116 is generally similar to that of core assembly 16 and it will therefore only be described briefly with emphasis on the differences between the operation of the two assemblies. FIG. 11 shows the core assembly 116 in its forwardmost position immediately after a part 114 has been molded in the cavity 112. The core body 130 has formed the I.D. of the molded part 114 and the expanded segments 134, 132 have formed the annular internal groove 136 in the molded part. The main portion of the base member 122 and the sleeve member 128 are received within mating portions 111, 109 of the entrance section 113 of the mold cavity.

Figure 12:
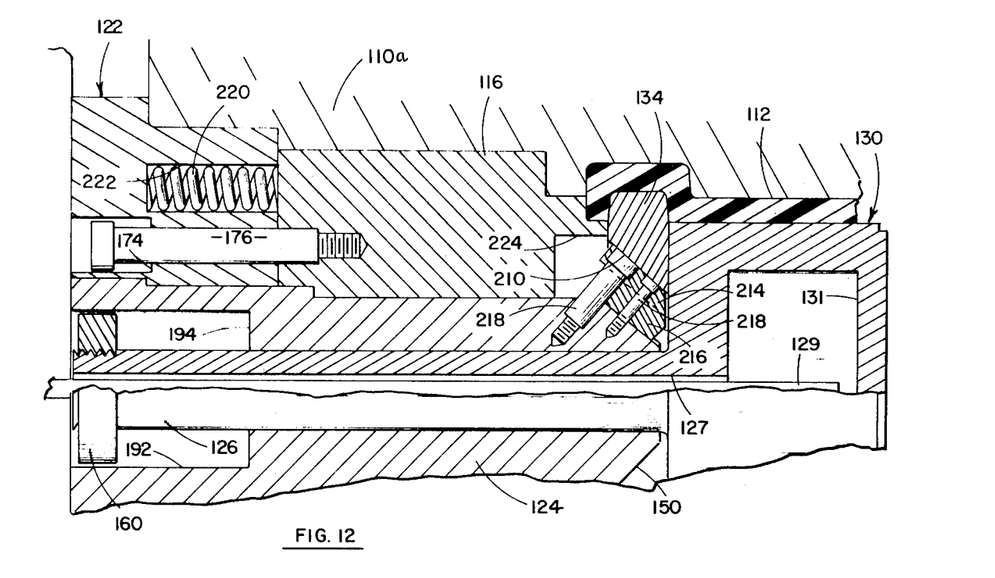
FIG. 12 is a partial side sectional view similar to FIG. 11, however, it is further enlarged and shows in particular a bar-shaped segment of the groove-defining means.
Figure 13:
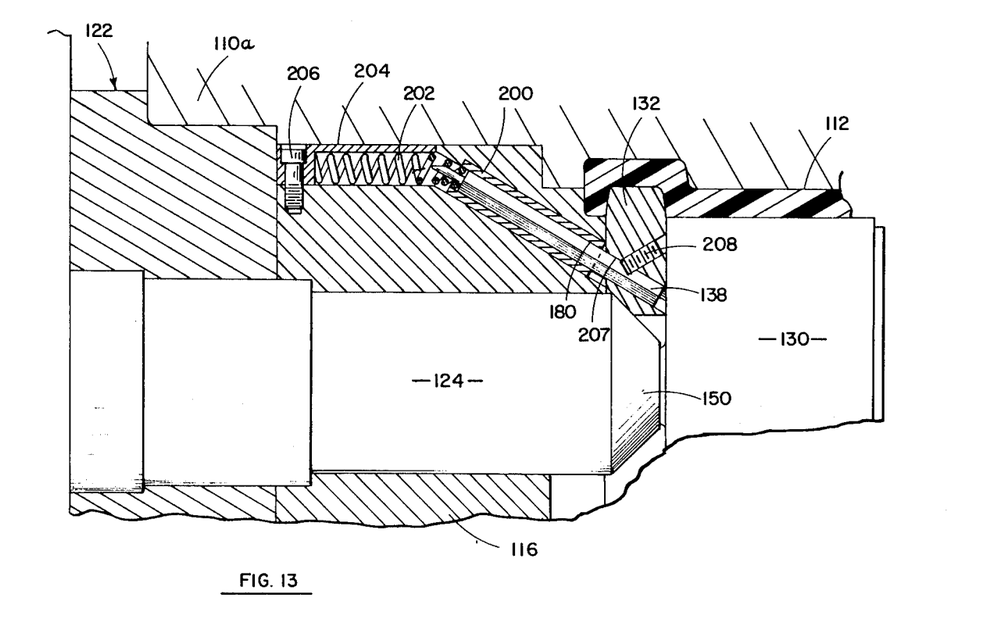
FIG. 13 is a side sectional view generally like FIG. 11, however, it is enlarged and shows in particular a wedge-shaped segment of the groove-defining means.

FIGS. 12 and 13 illustrate the positions of the parts, particularly with regard to the groove forming segments 132 and 134.

Next, the slide 118 of the mold machine begins to retract rearwardly, carrying with it the base member 122 and the central locking shaft 124. These parts move rearwardly relative to the sleeve member 128, the core body 130, and the central pull pin portion 126. The wedge-shaped segments 132 which are connected to the sleeve member 128 are thus not effected. The rearward movement of the central locking shaft 124 does draw the bar-shaped segments 134 radially inwardly as illustrated in FIG. 14. FIG. 14 shows the segments 134 drawn completely radially inwardly of the internal groove 136 formed in the part 114. FIG. 14 also shows the enlarged heads of bolts 176 bottomed out against annular shoulders 174 formed in the base member 122 so that further rearward movement of the base member will also effect rearward movement of the sleeve member 128. It may be noted that the forward end of the sleeve member 128 has recessed portions 224 which receive the rearward portions of the T-shaped projections 212 as those projections are drawn rearwardly by the rearward movement of the central locking shaft 124 relative to the sleeve member 128. The expansion of the springs 220 is also illustrated, maintaining the sleeve member 128 forwardly relative to the base member 122.

Figure 15:
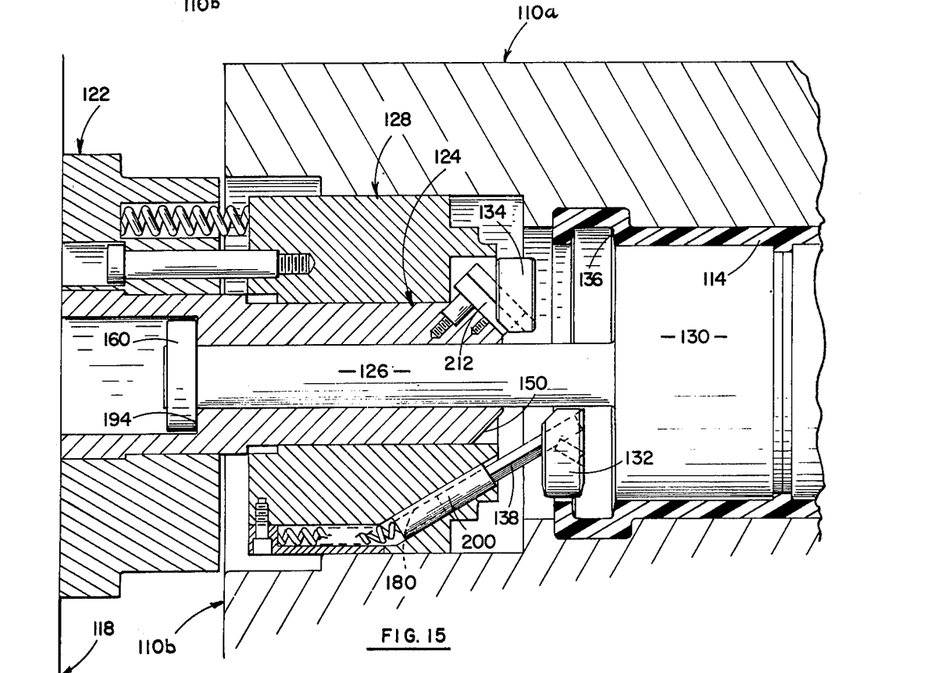
FIG. 15 is generally similar to FIGS. 11 and 14, however, the core assembly is shown further rearwardly retracted and the groove-defining means are shown fully contracted to their radially inward positions immediately prior to the main portion of the core being withdrawn from the molded part.
Figure 16:
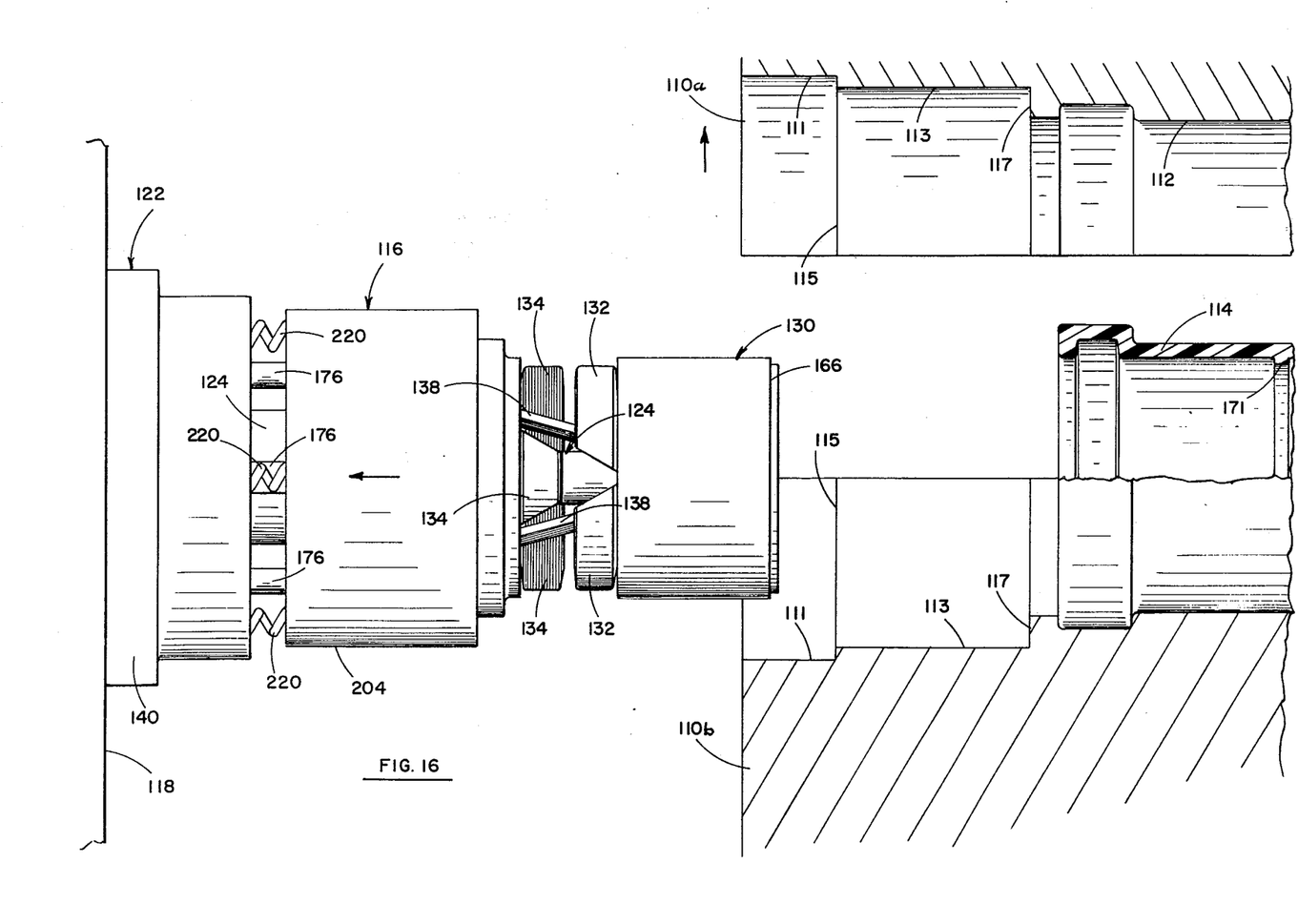
FIG. 16 is a side view of the core assembly in a fully retracted position, of the mold apparatus in an open position, and of a portion of the molded part (partially broken away and in section).

As further rearward movement of the base member 122 proceeds, the sleeve member 128 is also drawn rearwardly. This rearward movement of the sleeve member 128 causes the camming pins 138 to be moved forwardly and inwardly in their grooves 180 to thereby move the wedge-shaped segments 132 also radially inwardly. The bar-shaped segments 134 having been drawn radially inwardly sufficient to clear the internal groove 136 of the molded part, these bar-shaped segments 134 may now move axially rearwardly relative to the wedge-shaped segments 132. This relative axial movement between segments 134 and 132 (along the angled interfaces 226 shown in FIGS. 8 and 16) provides sufficient room for the wedge-shaped segments 132 to move radially inwardly and out of the annular groove 136. As shown in FIG. 15, when the wedge-shaped segments 132 have moved sufficiently radially inwardly to completely clear the annular groove 136, they will also move axially rearwardly along with the segments 134, the sleeve member 128, the base member 122 and the central locking shaft 124. At this time, only the main core body 130 and its central pull pin portion 126 have not moved rearwardly relative to the molded part 114 or to the mold 110. When the rearward movement of central locking shaft 124 causes the annular shoulder 194 to engage the foward surface of enlarged head 160 of the pin portion 126 (as shown in FIG. 15), further rearward movement beyond that position will withdraw the main core body 130 from the molded part 114 and from the mold cavity as shown in FIG. 16. The mold half 110a may then be moved away from the other half 110b to facilitate removal of the molded part 114.

For molding the next part, the mold halves 110a and 110b are closed and the core assemblies 116 are moved forwardly until they reassume the relative positions shown in FIG. 11.

Then in the illustrated embodiment in FIGS. 7–16, there is a positive mechanical drive of the bar-shaped segments 134. Further, the cam pins 138 are urged forwardly and inwardly by their associated springs 202. Spring means 220 are also provided to insure that the sleeve member 128 will remain in its forward position until the central locking shaft 124 has been drawn sufficiently rearwardly to effect the desired radial inward movement of the bar-shaped segments 134.

While the tubular molded part and the annular groove shown and described are circular in cross section and the inner and outer mold surfaces for molding the part and groove are similarly circular, it will be appreciated that the invention is applicable to parts and grooves of non-circular configuration. For example, it may be hexagon-shaped or have one or more flats. Further, while the invention appears to have particular valve for forming a continuous internal groove, it is also applicable to forming other internal recesses, particularly deep recesses and/or recesses which extend or occupy a major or substantial portion of the interior peripheral distance around the inside of the molded part. In other words, where the groove or recess forming means or segments or elements are relatively large or are crowded (in the sence that there is relatively little circumferential space between them), it is more difficult to find sufficient space for the contraction of the recess forming elements. Similarly, when deep grooves are desired, the required space for contraction is also increased. Further, the internal groove or recess may be formed at locations other than adjacent to the end of the tubular part, such at its center if such is desired. The molded part may have more than one groove or recess. For example, one groove may be formed adjacent either end of a straight fitting, or one may be formed adjacent each of the three or four ends of a T-shaped or X-shaped fitting. Various modifications and changes can be made in the illustrated apparatus without departing from the spirit and scope of the present invention. For example, the number of groove-forming segments or elements could be increased or decreased, and their configuration could be changed. In the latter connection, while it is desired that the elements or segments 34 be movable radially inwardly, the parallel sides illustrated could be made to angle away from one another as they progress in the radially inward direction, or such sides could even be curved or arcuate. It is desired, however, that the length of these elements measured circumferentially does not increase for progressively more radially outward portions thereof. Further, it is convenient, but not necessary, that all of the segments or elements in a group or set be of the same size and/or shape.

As a further example, core body 30 might be mounted on core 20 instead of on core assembly 16 (the stop rib 71 would be eliminated to permit withdrawal of the core 20 and core body from the molded part by movement to the right as viewed in the drawings).

As a still further example, the means for moving the groove forming elements or segments may take various other forms, although the illustrated form is simple, practical and effective.

While the illustrated core assemblies operate conveniently and automatically to expand and contract incident to forward and rearward motion, it may be desired in some circumstances to separately contact the groove-forming means as by separately controlling rearward retraction of means such as the sleeve member.

Having thus described my invention, what I desire to claim and secure by letters patent is:

1. A method for molding an annular groove internally in a tubular molded part, said method comprising:
   a. providing a mold core assembly having an outer mold surface and a plurality of first mold segments forming a first group and a plurality of second mold segments forming a second group thereof circumferentially around and intermediate the ends of the mold core,
   b. introducing said mold core assembly into a mold cavity,
   c. molding a part in said cavity and radially expanding said first and second groups of segments to form a recess in the molded part,
   d. moving the first group of segments radially inwardly until they are fully withdrawn from the recess,
   e. initiating axial movement of the first group of segments relative to the second group of segments after being withdrawn from said recess,
   f. moving the second group of segments radially inwardly until they are fully withdrawn from the recess, and which radial movement of the second group of segments starts approximately when or without substantial delay after said first group of segments starts said axial movement,
   g. initiating axial movement of the second group of segments, and
   h. removing the molded part from the cavity.

2. The method of claim 1 further comprising providing a locking means and moving same to a locking position for engaging at least some of the segments when they are in the expanded positions to lock said segments against radially inward movement, and thereafter unlocking said locking means to an unlocked position permitting radially inward movement of said segments.

3. The method of claim 1 wherein the second group of segments are configured to be blocked in their expanded positions from radially inward movement by said first group of segments in their expanded positions and so locking said second group of segments by the first group of segments in their expanded positions.

4. The method of claim 1 further comprising providing a locking means and moving same to a locking position for engaging at least said first group of said mold segments when they are in the expanded positions to lock said segments against radially inward movement and thereafter unlocking said locking means to an unlocked position permitting radially inward movement of said first group of segments.

5. The method of claim 1 further comprising providing an actuator means associated with the core assembly between a base means and said segments, actuating said actuator means for effecting movement of said segments between said expanded and contracted positions incident to movement of at least a portion of said base means.

6. The method of claim 2 wherein said segments have radially inward contact surfaces and said locking means is provided with a locking surface adapted to engage said radially inward contact surfaces of said segments, said method further comprising axially moving said locking surface between said locked and unlocked positions incident to axial movement of the core assembly.

7. The method of claim 5 wherein said actuator means comprises a positive drive mechanical coupling means between said second group of segments and said base means, and said method comprises actuating the positive drive coupling means to move said second group of segments radially inwardly from said expanded positions only after said first group of segments have been withdrawn from the recess.

8. The method of claim 7 wherein said method comprises moving a member associated with the base means axially relative to the remainder of said base means to operate the actuator means and thereby effect movement of the segments between the expanded and unexpanded positions.

9. The method of claim 1 wherein the molding of said part occurs simultaneously with the radial expansion of said first and second groups of segments.

10. The method of claim 1 wherein the axial movement of said first group of segments occurs during a portion of the radial movement thereof.

11. A method for molding a tubular part having an annular internal recess, said method comprising the steps of:
   a. providing a mold cavity;
   b. providing a movable core assembly in said cavity, which core assembly includes a first group and a second group of recess-forming means which combine to define in their radially expanded condition structure configured to form an annular internal recess in the part to be molded;
   c. molding a part in the mold cavity;
   d. effecting radially inward movement of the recess-forming means to thereby withdraw said means from the molded recess, said effected radially inward movement being achieved by:
      1. first moving the first group of recess-forming means radially inwardly until they are fully withdrawn from the recess,
      2. then effecting axial movement of the first group of recess-forming means after being withdrawn from the recess,
      3. moving the second group of recess-forming means radially inwardly until they are fully withdrawn from the recess, and which radial movement of the second recess-forming means starts approximately when or without substantial delay after said first recess-forming means start said axial movement,
      4. thereafter initiating axial movement of the second recess-forming means, e. moving the core assembly to withdraw it from the molded part; and f. removing the molded part from the mold cavity.

12. The method of claim 11 further comprising mechanically locking the recess-forming means against radially inward movement during the molding of the part in the mold cavity, and thereafter unlocking the recess-forming means to effect radial inward movement thereof.

13. The method of claim 11 further comprising mechanically locking the first group of recess-forming means against radially inward movement during the molding of the part in the mold cavity, and thereafter unlocking the first group of recess-forming means to effect radial inward movement thereof.

14. The method of claim 11 further comprising providing a locking means and moving same to a locking position for engaging at least some of the recess-forming means when they are in the expanded positions to lock said recess-forming means against radially inward movement, and thereafter unlocking said locking means to an unlocked position permitting radially inward movement of said recess-forming means.

15. The method of claim 11 wherein the second group of recess-forming means are configured to be blocked in their expanded positions from radially inward movement by said first group of recess-forming means in their expanded positions and so blocking said second group of recess-forming means by the first group of recess-forming means in their expanded positions.

16. The method of claim 11 further comprising providing an actuator means associated with the core assembly and between a base means and said recess-forming means, actuating said actuator means for effecting movement of said recess-forming means between said expanded and contracted positions incident to movement of at least a portion of said base means.

17. The method of claim 14 wherein said recess-forming means are segments which have radially inward contact surfaces and said locking means is provided with a locking surface adapted to engage said radially inward contact surfaces of said segments, said method further comprising axially moving said locking surface between said locked and unlocked positions incident to axial movement of the core assembly.

18. The method of claim 11 wherein the axial movement of the first group of recess-forming means occurs during a portion of the radial movement thereof.

* * * * *